United States Patent [19]

Shimohiro et al.

[11] Patent Number: 4,548,648
[45] Date of Patent: Oct. 22, 1985

[54] THICKENING AGENT FOR PASTE

[75] Inventors: Yoshiyuki Shimohiro, Sakai; Masazo Ogawa, Uji; Tooru Ohnishi, Nishinomiya, all of Japan

[73] Assignee: Dainippon Pharmaceutical Co., Ltd., Osaka, Japan

[21] Appl. No.: 616,378

[22] Filed: Jun. 1, 1984

[30] Foreign Application Priority Data

Jun. 2, 1983 [JP] Japan .................. 58-99115

[51] Int. Cl.$^4$ ............................. C08L 5/00
[52] U.S. Cl. .................... 106/208; 106/209; 106/205; 536/114
[58] Field of Search ........... 536/114, 116; 106/205, 106/208, 209

[56] References Cited

U.S. PATENT DOCUMENTS 3,223,699 12/1965 Schlageter .................. 260/209
4,089,646 5/1978 Harbereder et al. .......... 428/535

FOREIGN PATENT DOCUMENTS 2022095 12/1979 United Kingdom ........... 106/197.2

Primary Examiner—Theodore Morris
Attorney, Agent, or Firm—Armstrong, Nikaido, Marmelstein & Kubovcik

[57] ABSTRACT

A thickening agent for a paste which comprises a hydroxyalkylated-carboxymethylated product of a tamarind seed powder or a tamarind gum, the product satisfying the following equation (I):

$$y \geq 6.6 - 26.4 x + 35.1 x^2 - 15.6 x^3 \quad (I)$$

wherein y is the average degree of substitution of hydroxyalkyl group per saccharide unit and x is the average degree of substitution of carboxymethyl group per saccharide unit, provided that y and x fall within the following ranges:

$$0 < y < 2$$

$$0 < x < 2$$

The thickening agent is excellent in compatibility with a variety of dyes and gives a printing paste having excellent levelling property and wash-off property.

3 Claims, No Drawings

THICKENING AGENT FOR PASTE

BACKGROUND OF THE INVENTION

The present invention relates to a thickening agent comprising a hydroxyalkylated-carboxymethylated tamarind seed powder or tamarind gum suitable for a printing paste or binding paste.

Tamarind (Tamarindus Indica) is a leguminous evergreen tall tree produced in the tropics. Tamarind seed powder is obtained by grinding the seeds of tamarind from which the testa is removed. Tamarind gum is obtained by extracting and purifying the seed powder.

It is known that a reaction product prepared by subjecting a tamarind seed powder or gum to only hydroxyalkylation or a reaction product prepared by subjecting a tamarind seed powder or gum to only carboxymethylation is useful as a thickening agent for industrial pastes, for example, printing paste in textile industry and binding paste in paper industry (DE-AS No. 1,108,198, U.S. Pat. No. 3,223,699 and U.S. Pat. No. 4,089,646).

When the above-mentioned products are used in a printing paste, they are so much poor in compatibility with direct dyes, acid dyes or metal complex dyes, since they react with such dyes to gel. When the products are used in cotton printing employing reactive dyes, the wash-off property of the paste is lowered due to the reaction of them with the reactive dyes.

When the products are used in a binding paste, they exhibit a somewhat binding property but the property is inferior to that of starch widely used as a binding agent.

SUMMARY OF THE INVENTION

It is an object of the invention to provide a thickening agent for pastes, especially a printing paste, which has a good compatibility with a variety of dyes, and is capable of imparting good levelling property and wash-off property to the paste.

This and other objects of the invention will become apparent from the description hereinafter.

It has been found out that the above-mentioned objects can be accomplished by a thickening agent for pastes which comprises a hydroxyalkylated-carboxymethylated product of a tamarind seed powder or a tamarind gum, the product satisfying the following equation (I):

$$y \geq 6.6 - 26.4x + 35.1x^2 - 15.6x^3 \quad \text{(I)}$$

wherein y is the average degree of substitution of hydroxyalkyl group per saccharide unit and x is the average degree of substitution of carboxymethyl group per saccharide unit, provided that y and x fall within the following ranges:

$$0 < y < 2$$

$$0 < x < 2$$

Hereinafter the tamarind seed powder and the tamarind gum are represented by a generic term "tamarind", unless otherwise noted. Also the average degree of substitution of hydroxyalkyl group or carboxymethyl group per saccharide unit is referred to as "DS".

DETAILED DESCRIPTION

By the present inventor's wider and deeper researches, it has been found out that the above-mentioned drawbacks of the hydroxyalkylated tamarind and the carboxymethylated tamarind can be overcome by subjecting a tamarind to both hydroxyalkylation and carboxymethylation.

Further detailed researches have been made on the basis of this fact and revealed that the relationship between the DS of hydroxyalkyl group and the DS of carboxymethyl group has a noticeable influence on the properties of a hydroxyalkylated-carboxymethylated tamarind as a thickening agent. For example, in the case that the DS of hydroxyalkyl group is 1.0, desirable effects can be obtained when the DS of carboxymethyl group is not less than 0.35. In the case that the DS of hydroxyalkyl group is 0.3, desirable effects can be obtained when the DS of carboxymethyl group is not less than 0.48. In contrast thereto, in the case of a carboxymethylated tamarind, expected effects cannot be obtained even if the DS of carboxymethyl group is increased up to 0.62.

On the basis of the above results, it has been found out that when a tamarind is hydroxyalkylated and carboxymethylated so that the DS of carboxymethyl group x (0 < x < 2) and the DS of hydroxyalkyl group y (0 < y2) satisfy the above-mentioned equation (I), the obtained product has excellent properties as a thickening agent for pastes including printing paste and binding paste. That is, the product has an excellent compatibility with a variety of dyes and imparts excellent levelling property and wash-off property to a printing paste. Also the product has an excellent binding property.

In the present invention, it is more preferable that x (0x < 2) and y (0 < y < 2) satisfy the following equation (II):

$$y \geq 8.6 - 31.5x + 38.4x^2 - 15.6x^3 \quad \text{(II)}$$

The hydroxyalkylating reaction itself and the carboxymethylating reaction itself can be carried out by known methods, for example, as described in the above-mentioned patents.

For example, a tamarind is hydroxyalkylated in an aqueous medium under an alkaline condition with a hydroxyalkylating agent having 2 to 8 carbon atoms such as alkylene oxide, e.g. ethylene oxide and propylene oxide, or alkyl halohydrin, e.g. ethylene chlorhydrin and propylene chlorhydrin. The resulting product is then carboxymethylated in an aqueous medium under an alkaline condition with a carboxymethylating agent such as monochloroacetic acid or its salt. Examples of the alkali agent used in both reactions are alkali metal hydroxides such as sodium hydroxide and potassium hydroxide.

Usually the hydroxyalkylation is carried out by using the hydroxyalkylating agent in an amount of 1 to 200% by weight, preferably 30 to 85% by weight per the amount of a tamarind used, so that the DS of hydroxyalkyl group y satisfies the following equation (III), preferably the following equation (IV):

$$0 < y < 2 \quad \text{(III)}$$

$$0.3 \leq y \leq 0.85 \quad \text{(IV)}$$

provided that the final product satisfies the equation (I), preferably the equation (II). Usually the carboxymethylation is carried out by using a carboxy-methylating agent in an amount of 1 to 160% by weight, preferably 40 to 90% by weight per the amount of the hydroxyalkylated tamarind used, so that the DS of carboxymethyl group x satisfies the following equation (V), preferably the following equation (VI):

$$0 < x < 2 \quad (V)$$

$$0.45 \leq x \leq 0.85 \quad (VI)$$

provided that the final product satisfies the equation (I), preferably the equation (II).

The thickening agent of the present invention is usually used in the form of paste. The paste is prepared by adding water to the thickening agent in an amount of 1 to 50 times that of the latter depending upon the use thereof and agitating the resultant to swell the thickening agent. If needed, a variety of usual additives may be added to the paste. Examples of the additives are dyes, pigments and dyeing auxiliaries such as pH adjusting agent, reduction-preventing agent, dye dissolution agent, penetrant, levelling agent, mordant, anti-foaming agent, fixing agent and pre-treating agent. The thickening agent of the present invention does not absolutely react with such additives.

The thickening agent of the present invention sufficiently exhibits its excellent effects even when used alone, but it may be used in combination with a conventional thickening agent such as starch, modified starch, natural gum, modified gum, sodium alginate and carboxymethyl cellulose.

The present invention is more particularly described and explained by means of the following Examples. These Examples are intended to illustrate the invention and not be construed to limit the scope of the invention. It is to be understood that various changes and modifications may be made in the invention without departing from the spirit and scope thereof.

In the following Examples, the DS of hydroxypropyl group, the DS of hydroxyethyl group and the DS of carboxymethyl group were determined by the methods provided in American Standards of Test Method D-2367-72, D-2364-75 and D-1439-65, respectively.

EXAMPLE 1

Into a sealed reacting pot equipped with a stirrer were added 200 g of a tamarind seed powder and 24 g of a 38.5% by weight aqueous solution of sodium hydroxide, and the mixture was agitated at a room temperature for about one hour and allowed to stand overnight. To the mixture was added 80 g of propylene oxide and the reaction was conducted at 75° to 80° C. for 4 hours. After cooled to a room temperature and neutralized with a concentrated sulfuric acid, the reaction mixture was crushed, dried and ground to give 297 g of a powdered hydroxypropylated tamarind seed powder. The DS of hydroxypropyl group of the product was 0.32.

Into a three-necked flask were added 44.3 g of sodium hydroxide, 120 g of water and 609 ml of isopropyl alcohol and the sodium hydroxide was dissolved with agitating. To the solution was added 120 g of the hydroxypropylated tamarind, and it was dispersed. To the dispersion was added 46.5 g of monochloroacetic acid, and the resultant was heated under reflux for 2 hours. After cooled to a room temperature, the reaction mixture was neutralized with a concentrated sulfuric acid and filtered with suction. The filter cake was washed with an 80% aqueous methanol, dried and ground to give 178 g of a hydroxypropylated-carboxymethylated tamarind seed powder. The DS of carboxymethyl group of the product was 0.64.

When water was added to the product, it was easily gelatinized. The viscosity of a 1.5% by weight solution of the product in water was 23.4 cps. The viscosity was measured with a BL type Brookfield viscometer (made by Tokyo Keiki Co., Ltd) under the condition of 25° C. and 30 rpm (hereinafter the same).

EXAMPLE 2

The same procedures as in Example 1 except that 69.0 g of sodium hydroxide, 74.0 g of water, 375.6 ml of isopropyl alcohol, 120 g of the hydroxypropylated tamarind and 81.6 g of monochloroacetic acid were used in the carboxymethylation step were repeated to give a hydroxypropylated-carboxymethylated tamarind seed powder having a DS of hydroxypropyl group of 0.32 and a DS of carboxymethyl group of 0.85.

The product was easily gelatinized with water. The viscosity of a 1.5% by weight aqueous solution of the product was 9.2 cps.

EXAMPLE 3

Into a sealed reacting pot equipped with a stirrer were added 200 g of a tamarind seed powder and 36 g of a 38.5% by weight aqueous solution of sodium hydroxide, and the mixture was agitated at a room temperature for about one hour and allowed to stand overnight. To the mixture was added 120 g of propylene oxide and the reaction was conducted at 75° to 80° C. for 5 hours. After cooled to a room temperature and neutralized with a concentrated sulfuric acid, the reaction mixture was crushed, dried and ground to give 340 g of a powdered hydroxypropylated tamarind seed powder having a DS of hydroxypropyl group of 0.81.

Into a three-necked flask were added 69 g of sodium hydroxide, 74 g of water and 375.6 ml of isopropyl alcohol and the sodium hydroxide was dissolved with agitating. To the solution was added 120 g of the hydroxypropylated tamarind, and it was dispersed. To the dispersion was added 81.6 g of monochloroacetic acid, and the resultant was heated under reflux for 2 hours. After cooled to a room temperature, the reaction mixture was neutralized with a concentrated sulfuric acid and filtered with suction. The filter cake was washed with an 80% aqueous methanol, dried and ground to give 221 g of a hydroxypropylated-carboxymethylated tamarind seed powder. The DS of carboxymethyl group of the product was 0.80.

The product was easily gelatinized with water. The viscosity of a 3% by weight aqueous solution of the product was 21.5 cps.

EXAMPLE 4

The same procedures as in Example 3 except that the amount of sodium hydroxide and the amount of monochloroacetic acid in the carboxymethylation step were changed to 52.6 g and 62.1 g, respectively, were repeated to give a hydroxypropylated-carboxymethylated tamarind seed powder having a DS of hydroxypropyl group of 0.81 and a DS of carboxymethyl group of 0.62.

The product was easily gelatinized with water. The viscosity of a 3% aqueous solution of the product was 33.0 cps.

EXAMPLE 5

The same procedures as in Example 3 except that the amount of sodium hydroxide and the amount of monochloroacetic acid in the carboxymethylation step were changed to 39.4 g and 46.6 g, respectively, were repeated to give a hydroxypropylated-carboxymethylated tamarind seed powder having a DS of hydroxypropyl group of 0.81 and a DS of carboxymethyl group of 0.45.

The product was easily gelatinized with water. The viscosity of a 3% aqueous solution of the product was 27.0 cps.

EXAMPLE 6

The same procedures as in the hydroxypropylation step of Example 1 were repeated to give a hydroxypropylated tamarind seed powder having a DS of hydroxypropyl group of 0.31.

Into a three-necked flask were added 41 g of sodium hydroxide and 700 ml of a 95% by weight solution of methanol in water and the sodium hydroxide was dissolved with agitating. To the solution was added 162 g of the hydroxypropylated tamarind, and it was dispersed. To the dispersion was added 116 g of sodium monochloroacetate, and the resultant was heated under reflux for 2 hours. After cooled to a room temperature, the reaction mixture was neutralized with a concentrated sulfuric acid and filtered with suction. The filter cake was washed with an 80% aqueous methanol, dried and ground to give 269 g of a hydroxypropylated-carboxymethylated tamarind seed powder. The DS of carboxymethyl group of the product was 0.48.

The product was easily gelatinized with water. The viscosity of a 1.5% by weight aqueous solution of the product was 87 cps.

EXAMPLE 7

The same procedures as in Example 6 except that 60 g of ethylene oxide was used instead of propylene oxide were repeated to give a hydroxyethylated-carboxymethylated tamarind seed powder having a DS of hydroxyethyl group of 0.30 and a DS of carboxymethyl group of 0.50.

The product was easily gelatinized with water. The viscosity of a 1.5% by weight aqueous solution of the product was 65 cps.

EXAMPLE 8

The same procedures as in Example 6 except that 150 g of a tamarind gum was used instead of the tamarind seed powder were repeated to give a hydroxypropylated-carboxymethylated tamarind gum having a DS of hydroxypropyl group of 0.32 and a DS of carboxymethyl group of 0.52.

The product was easily gelatinized with water. The viscosity of a 1.5% by weight aqueous solution of the product was 180 cps.

COMPARATIVE EXAMPLE 1

The same procedures as in the hydroxypropylation step of Example 1 were repeated to give a hydroxypropylated tamarind seed powder having a DS of hydroxypropyl group of 0.31. The viscosity of a 1.5% by weight aqueous solution of the product was 41 cps.

COMPARATIVE EXAMPLE 2

The same procedures as in the hydroxyethylation step of Example 7 were repeated to give a hydroxyethylated tamarind seed powder having a DS of hydroxyethyl group of 0.30. The viscosity of a 1.5% by weight aqueous solution of the product was 39 cps.

COMPARATIVE EXAMPLE 3

The same procedures as in the hydroxypropylation step of Example 8 were repeated to give a hydroxypropylated tamarind gum having a DS of hydroxypropyl group of 0.32. The viscosity of a 1.5% by weight aqueous solution of the product was 246 cps.

COMPARATIVE EXAMPLE 4

The same procedures as in the carboxymethylation step of Example 6 except that a tamarind seed powder was used instead of the hydroxypropylated tamrind seed powder were repeated to give a carboxymethylated tamarind seed powder having a DS of carboxymethyl group of 0.32. The viscosity of a 1.5% by weight aqueous solution of the product was 162 cps.

COMPARATIVE EXAMPLE 5

The same procedures as in the carboxymethylation step of Example 6 except that 49 g of sodium hydroxide, 75 g of water, 380 ml of isopropyl alcohol, 57.9 g of monochloroacetic acid and 162 g of a tamarind seed powder were used were repeated to give a carboxymethylated tamarind seed powder having a DS of carboxymethyl group of 0.62. The viscosity of a 1.5% by weight aqueous solution of the product was 40 cps.

COMPARATIVE EXAMPLE 6

The same procedures as in Example 1 except that 29.6 g of sodium hydroxide, 74 g of water, 375.6 ml of isopropyl alcohol, 35 g of monochloroacetic acid and 120 g of the hydroxypropylated tamarind were used in the carboxymethylation step were repeated to give a hydroxypropylated-carboxymethylated tamarind seed powder having a DS of hydroxypropyl group of 0.32 and a DS of carboxymethyl group of 0.46. The viscosity of a 1.5% by weight aqueous solution of the product was 22.0 cps.

COMPARATIVE EXAMPLE 7

The same procedures as in Example 3 except that 21 g of sodium hydroxide, 74 g of water, 375.6 ml of isopropyl alcohol, 22.8 g of monochloroacetic acid and 120 g of the hydroxypropylated tamarind were used in the carboxymethylation step were repeated to give a hydroxypropylated-carboxymethylated tamarind seed powder having a DS of hydroxypropyl group of 0.81 and a DS of carboxymethyl group of 0.33. The viscosity of a 3% by weight aqueous solution of the product was 25 cps.

EXAMPLE 9

[Tests for compatibility, levelling property and wash-off property]

Each of the thickening agents obtained in Examples 1 to 8 and Comparative Examples 1 to 7, a tamarind seed powder, and a mixture of the hydroxypropylated tamarind (Comparative Example 1) and the carboxymethylated tamarind (Comparative Example 4) (1:1 by weight) and having a viscosity of 75 cps in the form of a 1.5% by weight aqueous solution were mixed with water, respectively, to prepare stock pastes having the concentration shown in Table 1. In the case of using the tamarind seed powder alone which was not dissolved into water at a room temperature, water was added to the tamarind seed powder and the resultant was heated at 75° C. for 15 minutes to dissolve the tamarind seed powder. The viscosity of a 1.5% by weight aqueous solution was 104 cps.

TABLE 1

| Stock paste No. | Thickening agent | Concentration of thickening agent in stock paste (% by weight) |
|---|---|---|
| 1 | Hydroxypropylated-carboxymethylated tamarind seed powder (Ex. 1) | 15 |
| 2 | Hydroxypropylated-carboxymethylated tamarind seed powder (Ex. 2) | 20 |
| 3 | Hydroxypropylated-carboxymethylated tamarind seed powder (Ex. 3) | 30 |
| 4 | Hydroxypropylated-carboxymethylated tamarind seed powder (Ex. 4) | 25 |
| 5 | Hydroxypropylated-carboxymethylated tamarind seed powder (Ex. 5) | 25 |
| 6 | Hydroxypropylated-carboxymethylated tamarind seed powder (Ex. 6) | 9 |
| 7 | Hydroxyethylated-carboxymethylated tamarind seed powder (Ex. 7) | 10 |
| 8 | Hydroxypropylated-carboxymethylated tamarind gum (Ex. 8) | 8 |
| 9 | Hydroxypropylated tamarind seed powder (Com. Ex. 1) | 12 |
| 10 | Hydroxyethylated tamarind seed powder (Com. Ex. 2) | 12 |
| 11 | Hydroxypropylated tamarind gum (Com. Ex. 3) | 6 |
| 12 | Carboxymethylated tamarind seed powder (Com. Ex. 4) | 8 |
| 13 | Carboxymethylated tamarind seed powder (Com. Ex. 5) | 12 |
| 14 | Hydroxypropylated-carboxymethylated tamarind seed powder (Com. Ex. 6) | 15 |
| 15 | Hydroxypropylated-carboxymethylated tamarind seed powder (Com. Ex. 7) | 25 |
| 16 | Tamarind seed powder | 9 |
| 17 | Mixture of hydroxypropylated tamarind seed powder (Com. Ex. 1) and carboxymethylated tamarind seed powder (Com. Ex. 4) | 10 |

The following tests were carried out to examine the applicability of the obtained stock pastes to reactive dye.

Employing each stock paste, a color paste having the following formulation was prepared and the compatibility with the reactive dye was observed.

| Component | % by weight |
|---|---|
| Levafix Brilliant Red E-4B (made by Bayer A.G.) | 2.0 |
| Urea | 5.0 |
| Sodium m-nitrobenzenesulfonate | 1.0 |
| NaHCO$_3$ | 2.0 |
| Water | 30.0 |
| Stock paste | 60.0 |

Employing the color paste, a cotton broad cloth was printed through a flat screen for test use (100 meshes). The printed cloth was dried at 70° C. for 5 minutes, steamed at 98° C. for 20 minutes, washed with water for 15 minutes and washed with hot water of 100° C. for 15 minutes. Then the treated cloth was soaped in a solution containing 2 g/l of Monogen (commercial name of a surface active agent made by Dai-ichi Kogyo Seiyaku Co., Ltd.) with 50:1 liquor ratio at 100° C. for 10 minutes, washed with water and dried. Thus obtained printed cloth was observed with respect to the levelling property and the wash-off property.

The results of the tests are as follows:

(i) Compatibility

All stock pastes were good in compatibility with the reactive dye.

(ii) Levelling property and wash-off property

All color pastes were good in levelling property. All color pastes employing the thickening agents of the invention were noticeably excellent in wash-off property, but all color pastes employing the thickening agents other than that of the invention were remarkably poor in wash-off property and not applicable to practical use.

EXAMPLE 10

[Tests for compatibility, levelling property and wash-off property]

Employing each of Stock paste Nos. 1 to 5 and Stock paste Nos. 9 to 17 obtained in Example 9, a color paste having the following formulation for reactive dye was prepared. Employing the obtained color paste, printing was carried out in the same manner as in Example 9.

| Component | % by weight |
|---|---|
| Remazol Turquoise Blue G (made by Hoechst A.G.) | 3.0 |
| Urea | 10.0 |
| Sodium m-nitrobenzenesulfonate | 1.0 |
| Na$_2$CO$_3$ | 3.0 |
| Water | 23.0 |
| Stock paste | 60.0 |

The results thereof are as follows:

(i) Compatibility

All stock pastes were good in compatibility with the reactive dye.

(ii) Levelling property and wash-off property

All color pastes were good in levelling property. All color pastes employing the thickening agents of the invention were noticeably excellent in wash-off property, but all color pastes employing the thickening agents other than that of the invention were remarkably poor in wash-off property and not applicable to practical use.

EXAMPLE 11

[Tests for compatibility, levelling property and wash-off property]

The following tests were carried out to examine the applicability of Stock paste Nos. 1 to 17 obtained in Example 9 to direct dye.

(i) Compatibility

Employing each stock paste, a color paste having the following formulation was prepared.

| Component | % by weight |
|---|---|
| Kayarus Supra Rubine BL (made by Nippon Kayaku Co., Ltd.) | 2.0 |
| Thiodiethyleneglycol | 2.0 |
| Hot water | 36.0 |

| Component | % by weight |
| --- | --- |
| Stock paste | 60.0 |

The obtained color pastes were observed by the naked eye. All stock pastes employing the thickening agents of the invention gave uniform color pastes and were good in compatibility with the direct dye. However, all stock pastes employing the thickening agents other than that of the invention caused the gelation of color paste and were bad in compatibility with the direct dye.

(ii) Levelling property and wash-off property

Employing each of color pastes obtained above, a cotton broad cloth was printed through a flat screen for test use (100 meshes). The printed cloth was dried at 70° C. for 5 minutes, steamed at 98° C. for 20 minutes and washed with water for 15 minutes. Then the cloth was soaped in a solution containing 2 g/l of Amiladin D (commercial name of a surface active agent made by Dai-ichi Kogyo Seiyaku Co., Ltd.) with 50:1 liquor ratio at 60° C. for 10 minutes, washed with water and dried. Thus obtained printed cloth was observed with respect to the levelling property and the wash-off property.

All color pastes employing the thickening agents of the invention were excellent in levelling property and wash-off property. With respect to the color pastes employing the thickening agents other than that of the invention, tests for those properties were not carried out, since their poor compatibility was already confirmed.

EXAMPLE 12

[Tests for compatibility, levelling property and wash-off property]

The following tests were carried out to examine the applicability of Stock paste Nos. 1 to 17 obtained in Example 9 to acid dye.

(i) Compatibility

Employing each stock paste, a color paste having the following formulation was prepared.

| Component | % by weight |
| --- | --- |
| Nylosan Red N3BL | 2.0 |
| (made by Sandoz A.G.) | |
| Thiodiethyleneglycol | 2.0 |
| Ammonium tartrate | 3.0 |
| Hot water | 33.0 |
| Stock paste | 60.0 |

As to the compatibility, the same results as in Example 11 were obtained.

(ii) Levelling property and wash-off property

Employing each of the color pastes obtained above, a nylon jersey cloth was printed through a flat screen for test use (100 meshes). The printed cloth was dried at 70° C. for 5 minutes, steamed at 98° C. for 30 minutes and washed with water for 15 minutes. Then the cloth was soaped in a solution containing 2 g/l of Amiladin D with 50:1 liquor ratio at 60° C. for 10 minutes, washed with water and dried. Thus obtained printed cloth was observed with respect to the levelling property and the wash-off property.

All color pastes employing the thickening agents of the invention were excellent in levelling property and wash-off property. With respect to the color pastes employing the thickening agents other than that of the invention, tests for those properties were not carried out, since their poor compatibility was already confirmed.

EXAMPLE 13

[Tests for compatibility, levelling property and wash-off property]

The following tests were carried out to examine the applicability of Stock paste Nos. 1 to 17 obtained in Example 9 to metal complex dye.

(i) Compatibility

Employing each stock paste, a color paste having the following formulation was prepared.

| Component | % by weight |
| --- | --- |
| Aizen Opal Black New Conc. | 2.0 |
| (made by Hodogaya Chemical Co., Ltd.) | |
| Thiodiethyleneglycol | 2.0 |
| Ammonium tartrate | 3.0 |
| Hot water | 33.0 |
| Stock paste | 60.0 |

As to the compatibility, the same results as in Example 11 were obtained.

(ii) Levelling property and wash-off property

Employing each of the color pastes obtained above, the printing of nylon jersey cloth was carried out in the same manner as in Example 12. As to the levelling property and wash-off property, the same results as in Example 12 were obtained.

In addition to the ingredients used in the Examples, other ingredients can be used in the Examples as set forth in the specification to obtain substantially the same results.

What we claim is:

1. A thickening agent for a paste which comprises a hydroxyalkylated-carboxymethylated product of a tamarind seed powder or a tamarind gum, the product satisfying the following equation (I):

$$y \geq 6.6 - 26.4x + 35.1x^2 - 15.6x^3 \qquad (I)$$

wherein y is the average degree of substitution of hydroxyalkyl group per saccharide unit and x is the average degree of substitution of carboxymethyl group per saccharide unit, provided that y and x fall within the following ranges:

$$0 < y < 2$$

$$0 < x < 2.$$

2. The thickening agent of claim 1, wherein y and x satisfy the following equation (II):

$$y \geq 8.6 - 31.5x + 38.4x^2 - 15.6x^3 \qquad (II).$$

3. The thickening agent of claim 1 which is used for a printing paste.

* * * * *